Feb. 27, 1968 G. J. OTTONELLO 3,370,375

FISH LURE

Filed July 22, 1965

GINO J. OTTONELLO
INVENTOR.

BY

Townsend and Townsend

United States Patent Office 3,370,375
Patented Feb. 27, 1968

3,370,375
FISH LURE
Gino J. Ottonello, 1452 Adobe Drive,
Pacifica, Calif. 94044
Filed July 22, 1965, Ser. No. 473,918
2 Claims. (Cl. 43—42.45)

ABSTRACT OF THE DISCLOSURE

A fish lure having a weighted elongated body with an upper and lower face, each of said faces having a lengthwise channel formed therein, the upper channel being closed at the forward end of the lure by a raised projection and terminating in a raised projection forming branched troughs, and the channel on the lower face being open at the forward end and terminating in the same manner as the upper channel.

---

This invention relates to a fish lure. More specifically, the invention relates to a weighted lure of the type which is conventionally useful in surf casting and of the type which has sufficient weight to allow the lure to be projected a maximum distance into the surf and which will furthermore, because of its novel shape, have a water traverse characteristic particularly desirable in fish attraction and fish line mobility.

An object of this invention is to provide a weighted lure shaped so that when traveled through the water will exhibit features of buoyancy due to the waterflow over the surfaces of the lure.

A further object of this invention is to provide a lure shape in which there is a regular waterflow through the bottom portion of the lure to maintain rotational stability for the lure and an interrupted contour across the top surface of the frontal portion of the lure to maintain an area which creates a lift or buoyant function in its waterflow travel.

A further object of this invention is to provide a weighted fishing lure having on its bottom surface a central longitudinal channel extending from the frontal portion of the lure rearwardly and terminating in two outwardly extending channels short of the trailing end, and wherein the top portion of the lure is formed with a similar channel and termination but in which the frontal portion of the channel is obstructed with a convex frontal face to establish an interruption of flow prior to water entry into the channel.

One of the features and advantages of this device lies in the fact that the lure will travel when pulled through the water in a relatively buoyant mode and will maintain an axis with the bottom surface pointing downwardly and the top surface pointing upwardly with high resistance towards rotation.

Other objects, features and advantages of the present invention will be more apparent after referring to the following specification and attached drawings, in which.

Figure 1:
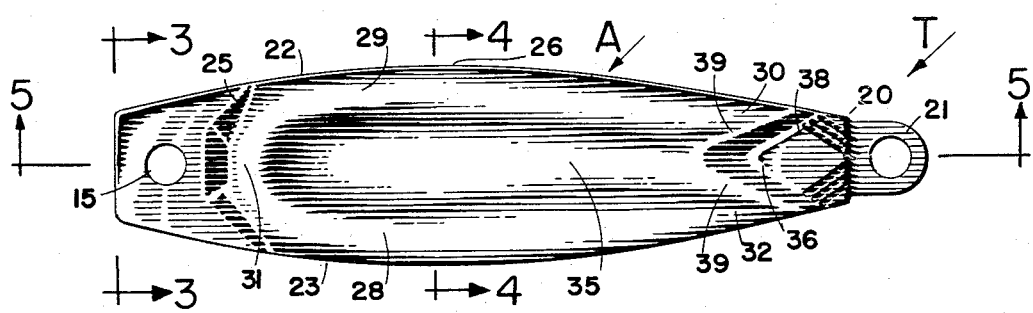
FIG. 1 is a plan view showing the top face of the lure.
Figure 3:
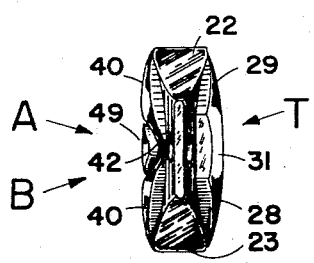
FIG. 3 is a view showing the front or frontal end of the lure.
Figure 4:
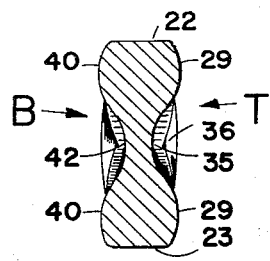
FIG. 4 is a cross-sectional view taken at line 4—4 of FIG. 1.
Figure 2:
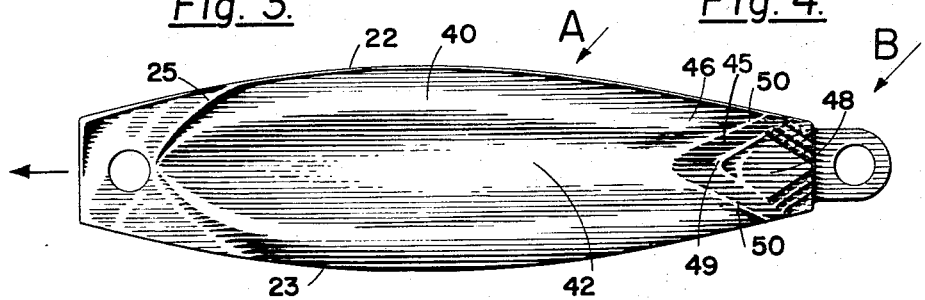
FIG. 2 is a similar plan view showing the bottom face of the lure.
Figure 5:
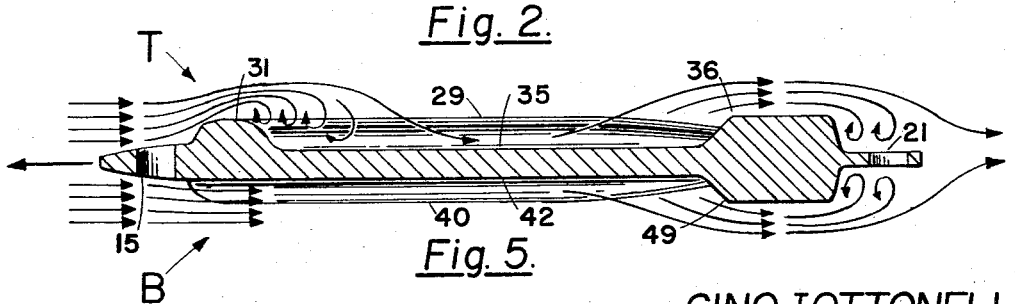
FIG. 5 is a longitudinal cross-sectional view showing schematically the waterflow path along the central portion of the lure.

The fish lure of the present invention comprises an elongated body generally indicated at A having at its front end a line receiving aperture 15 formed to receive via a swivel connector a fish line of conventional character. The terminating or rear end 20 of the lure is provided with a similar eye or aperture 21 to which a hook or other fishing tackle can be conveniently attached. The body A is formed of relatively heavy metal, such as an alloy comprising approximately 75% lead and 25% tin, and is conveniently formed in a length of approximately two to four inches, with a width from approximately one half to one inch.

In top elevation the two side walls 22 and 23 are formed of walls extending in a slightly convex curvature from the frontal end 25 to the terminating end 20 bowing out to the maximum dimension at mid-section 26. The top face of the lure is formed with an upwardly rising projection forming a generally U-shaped waterflow guide 29 which extends from a point approximately one half inch or so from the aft or terminating end 20, as indicated at 30 in the drawings, forwardly to form a frontal web 31, and thence rearwardly along the opposite side at 28 to a point of similar termination 32. The area in between the two waterflow legs forms a depression or channel 35. On the terminating end 20 an upward V-shaped water guide is provided extending with its apex 36 at the mid-point of channel 35 and having two side walls 38 which form two laterally terminating troughs 39 which direct waterflow from channel 35 out the two troughs 39 in a direction which is generally lateral to the longitudinal axis of the channel. Water guide 29 is generally formed in a rounded cross-sectional shape to provide even waterflow across all axes of its face. The bottom B of the lure is formed with two longitudinal water guides 40 extending along the outer edges 22 and 23 inwardly to define a channel 42 therebetween running from the frontal end 25 of the lure rearwardly. Unlike the top T the two guides are not joined with the web as at 31 on top T but form an open front for the channel. The termination or rear portion of channel 42 and guides 40 is formed in the exact configuration as top T having two output or termination troughs 45 which are formed by the terminating ends 46 of guides 40 and the V-shaped projection 48 having its apex 49 in central alignment with channel 42 and having two side walls 50 forming the aft terminating wall of the troughs.

It is believed obvious that additional strength can be imparted to the connecting eyes 15 and 21 by imbedding strong steel rings within the casting, if such additional strength is a requisite.

In operation, the head of the fish line is connected preferably by a swivel connector at aperture 15. Appropriate fishing tackle or hooks are connected at 21. The lure is then cast in the conventional manner or otherwise employed in fishing applications, such as trolling, as required. When the lure hits the water it will have a natural tendency to sink because of its substantially high density. However, when reeled in or pulled through the water the motivating force will occur from aperture 15 which will cause the waterflow to travel in relatively straight line across the bottom surface through trough 42 and thence laterally outwardly in angular direction from both sides of the lure to troughs 45. It is believed that the lateral expulsion of waterflow tends to give directional stability to the lure and prevents lateral movement during waterflow. The waterflow across the top T is interrupted by the web portion of the waterflow barrier or guide 31 which causes an area of relatively low pressure or velocity immediate to the rear of the barrier. This causes an area of relative lift to occur on the frontal top portion immediate to the rear of the web 31 which tends to hold the front end of the lure in an upward position with the top T facing in an upwardly directing relation. The terminating flow at the rear through troughs 39 is in substantially the same axis as that appearing at bottom B. Thus, the top and bottom exit troughs formulate terminating waterflow which tends to provide the stability against lateral movement and is also orientated to prevent rotation due to their symmetry. It can thus be seen that the lure will have a directional characteristic which is linear and without rotational components.

While one embodiment of this invention has been shown and described, it will be apparent that other adaptations and modifications can be made without departing from the true spirit and scope of the invention.

What is claimed is:

1. A fishing lure of the type having a weighted elongate body provided with opposite faces, means mounted on the front end of the lure for attaching a fishing line, and means mounted on the rear end of said lure for attaching fishing tackle, comprising each face of said lure having a pair of longitudinally disposed guides in the form of projections disposed in substantially parallel spaced relation along opposite sides of said lure to form a centrally aligned channel, each of said guides terminating at a point distal from the rear end of said lure, a centrally disposed raised projection mounted on the rear end of said lure having a generally frontal facing triangular face having its apex disposed in central alignment of the channel formed between said two guides and thence angularly extending outwardly to the sides of said lure to form a pair of laterally terminating troughs formed between the rear end of said guides and the forward sides of said triangular protuberance, one of said faces having the channel opening to the front of said lure, the opposite of said faces having a guide joining the two guides at the frontal portion of said lure to form a waterflow protuberance across the frontal end of the channel.

2. A fishing lure of the type having a weighted elongate body, means mounted on the front end of the lure for attaching a fishing line, means mounted on the rear end of said lure for attaching fishing tackle, said body having an upper face and a lower face, each of said faces having a channel formed therein, said channels extending parallel to the elongate axis of the lure, the rearward portion of each of said channels having a Y shape formed by a raised projection mounted at the rear of the lure, and a raised projection mounted on the upper face for closing the frontward portion of the channel on said upper face.

References Cited

UNITED STATES PATENTS

| 1,627,455 | 5/1927 | Peterson | 43—42.48 X |
| 2,512,913 | 6/1950 | Boice | 43—42.45 X |
| 2,632,277 | 3/1953 | Cogswell et al. | 43—42.45 X |
| 2,736,125 | 2/1956 | Perkins | 43—42.45 X |

SAMUEL KOREN, *Primary Examiner.*

D. J. LEACH, *Assistant Examiner.*